United States Patent
Imayama et al.

(10) Patent No.: US 8,040,448 B2
(45) Date of Patent: Oct. 18, 2011

(54) TRANSFLECTIVE LIQUID CRYSTAL DISPLAY DEVICE

(75) Inventors: Hirotaka Imayama, Mobara (JP);
Tetsuya Nagata, Mobara (JP); Osamu Itou, Hitachi (JP); Shoichi Hirota, Hitachi (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 13/103,329

(22) Filed: May 9, 2011

(65) Prior Publication Data

US 2011/0211149 A1 Sep. 1, 2011

Related U.S. Application Data

(63) Continuation of application No. 11/669,216, filed on Jan. 31, 2007.

(30) Foreign Application Priority Data

Feb. 1, 2006 (JP) .................................. 2006-024009

(51) Int. Cl.
*G02F 1/1343* (2006.01)
(52) U.S. Cl. .......................................................... 349/39
(58) Field of Classification Search ........................ None
See application file for complete search history.

(56) References Cited

U.S. PATENT DOCUMENTS

| 6,914,656 | B2 | 7/2005 | Sakamoto et al. |
| 7,671,942 | B2 | 3/2010 | Nam |
| 2005/0030458 | A1 | 2/2005 | Sasabayashi |
| 2006/0087605 | A1 | 4/2006 | Sasabayashi |
| 2006/0109406 | A1 | 5/2006 | Sasabayashi |
| 2006/0125970 | A1 | 6/2006 | Inoue |
| 2006/0170846 | A1* | 8/2006 | Ozawa .......................... 349/114 |
| 2006/0227266 | A1* | 10/2006 | Tasaka et al. .................. 349/113 |
| 2009/0262284 | A1 | 10/2009 | Hamilton |

FOREIGN PATENT DOCUMENTS

| JP | 2003-207795 | 7/2003 |
| JP | 2003-344837 | 12/2003 |
| KR | 2004-0025471 | 3/2004 |

* cited by examiner

*Primary Examiner* — Timothy L Rude
(74) *Attorney, Agent, or Firm* — Antonelli, Terry, Stout & Kraus, LLP.

(57) ABSTRACT

A liquid crystal display device includes a first substrate, a second substrate, a liquid crystal layer formed between the first substrate and the second substrate, and a transistor formed in a pixel. A first insulating layer is formed over the transistor, a first electrode is formed on the first insulating layer, a second insulating layer is formed on the first electrode, a second electrode is formed on the second insulating layer, and the first electrode has a plane shape and the second electrode has a line shape portion.

8 Claims, 7 Drawing Sheets

TRANSFLECTIVE LIQUID CRYSTAL DISPLAY DEVICE

This application is a continuation of U.S. application Ser. No. 11/669,216, filed Jan. 31, 2007, the contents of which is incorporated herein by reference.

The present application claims priority from Japanese application JP2006-024009 filed on Feb. 1, 2006, the content of which is hereby incorporated by reference into this application.

BACKGROUND OF THE INVENTION

1. Field of the Invention

The present invention relates to a transflective liquid crystal display device, and more particularly to an IPS-type transflective liquid crystal display device.

2. Description of the Related Art

A transflective liquid crystal display device which includes a transmissive part and a reflective part within one sub pixel has been used as a display of a portable equipment.

Such a transflective liquid crystal display device adopts a vertical electric field method in which liquid crystal is sandwiched between a pair of substrates, and an electric field is applied to the liquid crystal in the direction perpendicular to planar surfaces of the pair of substrates thus driving the liquid crystal. Further, to match characteristic of a transmissive part and a reflective part to each other, a step is formed between the transmissive part and the reflective part, and a phase difference plate is arranged between a polarizer and a liquid crystal layer.

As the liquid crystal display device, there has been known an IPS-type liquid crystal display device, wherein pixel electrodes (PIX) and counter electrodes (CT) are formed on a same substrate, and an electric field is applied between both electrodes thus rotating the liquid crystal within a plain of a substrate thus controlling a contrast. Accordingly, the IPS type liquid crystal display device has a characteristic that a contrast of a displayed image is not inverted when a screen is viewed in the oblique direction.

To make use of this characteristic, a technical concept which constitutes a transflective liquid crystal display device using such an IPS-type liquid crystal display device has been proposed in a following patent document 1 or the like, for example.

Here, as a prior-art document relevant to the present invention, the following is named.

[Patent document 1] JP-A-2003-344837

SUMMARY OF THE INVENTION

However, the IPS-type transflective liquid crystal display device has a drawback that, for example, the IPS-type transflective liquid crystal display device exhibits low display efficiency and contrast in the reflective part compared to a VA-type transflective liquid crystal display device.

FIG. 8 is a graph showing a voltage (V) applied to liquid crystal, a transmission efficiency (P) characteristic and a reflection efficiency (R) characteristic of the IPS-type transflective liquid crystal display device.

In general, the voltage which is applied to the liquid crystal is limited to approximately 5V. For example, when the voltage of 4V is applied to the liquid crystal, as can be understood from FIG. 8, the reflection efficiency (R) is set to approximately $2/3$ of the transmission efficiency (P).

The present invention has been made to overcome the above-mentioned drawback of the related art, and it is an advantage of the present invention to provide a technique which can enhance display efficiency and a contrast of a reflective part in an IPS-type transflective liquid crystal display device compared to a conventional IPS-type transflective liquid crystal display device.

The above-mentioned and other advantages and novel features of the present invention will become apparent from the description of this specification and attached drawings.

To briefly explain the summary of typical inventions among inventions described in this specification, they are as follows.

(1) In a transflective liquid crystal display device in which the liquid crystal display device includes a liquid crystal display panel having a pair of substrates and liquid crystal sandwiched between the pair of substrates, the liquid crystal display panel includes a plurality of sub pixels each having a transmissive part and a reflective part, each sub pixel out of the plurality of sub pixels includes a pixel electrode which is formed on one substrate out of the pair of substrates and a counter electrode which is formed on the one substrate, and an electric field is generated by the pixel electrode and the counter electrode thus driving the liquid crystal, a portion of the counter electrode of the each sub pixel at the reflective part constitutes a reflective electrode, the reflective electrode includes an uneven portion and a flat portion, and the flat portion of the reflective electrode is arranged on a boundary portion between the transmissive part and the reflective part of the each sub pixel.

(2) In the above-mentioned constitution (1), a portion of the pixel electrode may be arranged in a region where the flat portion of the reflective electrode is formed.

(3) In the above-mentioned constitution (1), the pixel electrode may include a comb-teeth electrode in the transmissive part, a comb-teeth electrode in the reflective part, and a strip-like connection part which is formed between the comb-teeth electrode in the transmissive part and the comb-teeth electrode in the reflective part, and the strip-like connection part may be arranged in a region where the flat portion of the reflective electrode is formed.

(4) In any one of the above-mentioned constitutions (1) to (3), the one substrate out of the pair of substrates may include a through hole which is provided for allowing a video voltage to be applied to the pixel electrode, and the through hole may be arranged in a region where the flat portion of the reflective electrode is formed.

(5) In any one of the above-mentioned constitutions (1) to (4), the pixel electrode in the reflective part may be arranged in a region of the reflective electrode where the uneven portion is formed.

(6) In any one of the above-mentioned constitutions (1) to (5), the pixel electrode may include comb-teeth electrodes, and a number of the comb-teeth electrodes of the pixel electrode may be large in the reflective part compared to the number of comb-teeth electrodes of the pixel electrode in the transmissive part.

(7) In any one of the above-mentioned constitutions (1) to (6), the pixel electrode may include a comb-teeth electrode, and in the direction orthogonal to the extending direction of the comb-teeth electrode of the pixel electrode, a distance from a center line between the sub pixels arranged close to each other to an end portion of the comb-teeth electrode of the pixel electrode may be smaller in the reflective part than in the transmissive part.

(8) In the constitution (7), a comb-teeth interval of the pixel electrodes may be set smaller in the reflective part than in the transmissive part.

(9) In any one of the above-mentioned constitutions (1) to (8), the pixel to electrode may be formed of a transparent electrode.

(10) In any one of the above-mentioned constitutions (1) to (9), the counter electrode may be formed of a transparent electrode.

(11) In any one of the above-mentioned constitutions (1) to (10), the reflective electrode may be formed of a metal film.

(12) In any one of the above-mentioned constitutions (1) to (10), the reflective electrode may be formed of a metal film which is formed on the counter electrode.

(13) In any one of the above-mentioned constitutions (1) to (12), the liquid crystal display device may include an interlayer insulation film which is formed on the counter electrode, and the pixel electrode may be formed on the interlayer insulation film.

(14) In any one of the above-mentioned constitutions (1) to (13), another substrate out of the pair of substrates may have a step forming layer in a region which faces the reflective part in an opposed manner.

(15) In the constitution (14), the step forming layer may be formed between the neighboring sub pixels, and the respective reflective parts of two neighboring sub pixels may be formed in a region where the step forming layer is formed.

(16) In any one of the above-mentioned constitutions (1) to (15), another substrate out of the pair of the substrates may include an optical element (for example, a ½ wave plate) which controls a polarization state of light in a region which faces the reflective part in an opposed manner.

(17) In the constitution (16), the optical element may be formed between the neighboring sub pixels, and the respective reflective parts of two neighboring sub pixels may be formed in a region where the optical element is formed.

(18) In the constitution (16) or the constitution (17), the optical element may be a ½ wave plate.

(19) In a transflective liquid crystal display device in which the liquid crystal display device includes a liquid crystal display panel having a pair of substrates and liquid crystal sandwiched between the pair of substrates, the liquid crystal display panel includes a plurality of sub pixels each having a transmissive part and a reflective part, each sub pixel out of the plurality of sub pixels includes a pixel electrode which is formed on one substrate out of the pair of substrates and a counter electrode which is formed on the one substrate, and an electric field is generated by the pixel electrode and the counter electrode thus driving the liquid crystal, another substrate out of the pair of substrates includes a step forming layer in a region which faces the reflective part in an opposed manner such that a layer thickness of the liquid crystal in the reflective part is set smaller than a layer thickness of the liquid crystal in the transmissive part, the pixel electrode includes comb-teeth electrodes, and a number of the comb-teeth electrodes of the pixel electrode is larger in the reflective part than in the transmissive part.

(20) In a transflective liquid crystal display device in which the liquid crystal display device includes a liquid crystal display panel having a pair of substrates and liquid crystal sandwiched between the pair of substrates, the liquid crystal display panel includes a plurality of sub pixels each having a transmissive part and a reflective part, each sub pixel out of the plurality of sub pixels includes a pixel electrode which is formed on one substrate out of the pair of substrates and a counter electrode which is formed on the one substrate, and an electric field is generated by the pixel electrode and the counter electrode thus driving the liquid crystal, another substrate out of the pair of substrates includes a step forming layer in a region which faces the reflective part in an opposed manner such that a layer thickness of the liquid crystal in the reflective part is set smaller than a layer thickness of the liquid crystal in the transmissive part, the pixel electrode includes a comb-teeth electrode, and in the direction orthogonal to the extending direction of the comb-teeth electrode of the pixel electrode, a distance from a center line between the sub pixels which are arranged close to each other to an end portion of the comb-teeth electrode of the pixel electrode is set smaller in the reflective part than in the transmissive part.

(21) In the constitution (20), a comb-teeth interval of the pixel electrodes may be set small in the reflective part compared to the comb-teeth interval of the pixel electrodes in the transmissive part.

To briefly explain advantages obtained by typical inventions among the inventions described in this specification, they are as follows.

According to the IPS-type transflective liquid crystal display device of the present invention, it is possible to enhance display efficiency and a contrast of the reflective part compared to the related art.

DESCRIPTION OF THE PREFERRED EMBODIMENTS

Hereinafter, embodiments of the present invention are explained in detail in conjunction with drawings.

Here, in all drawings for explaining the embodiments, parts having identical functions are given same symbols and their repeated explanation is omitted.

Embodiment 1

Figure 1:
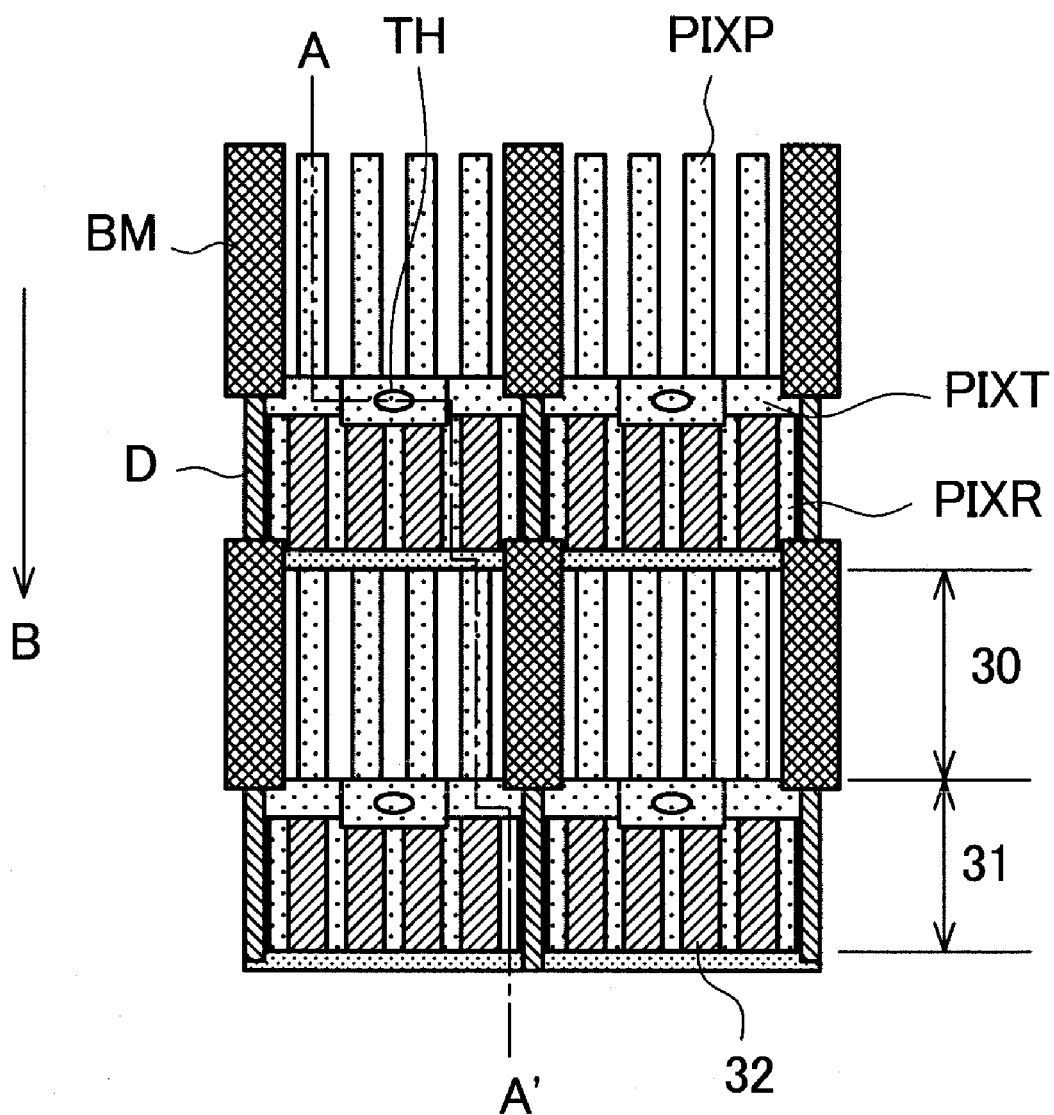
FIG. 1 is a plan view showing the electrode structure of a sub pixel of a transflective liquid crystal display device of an embodiment 1 according to the present invention.
Figure 2:
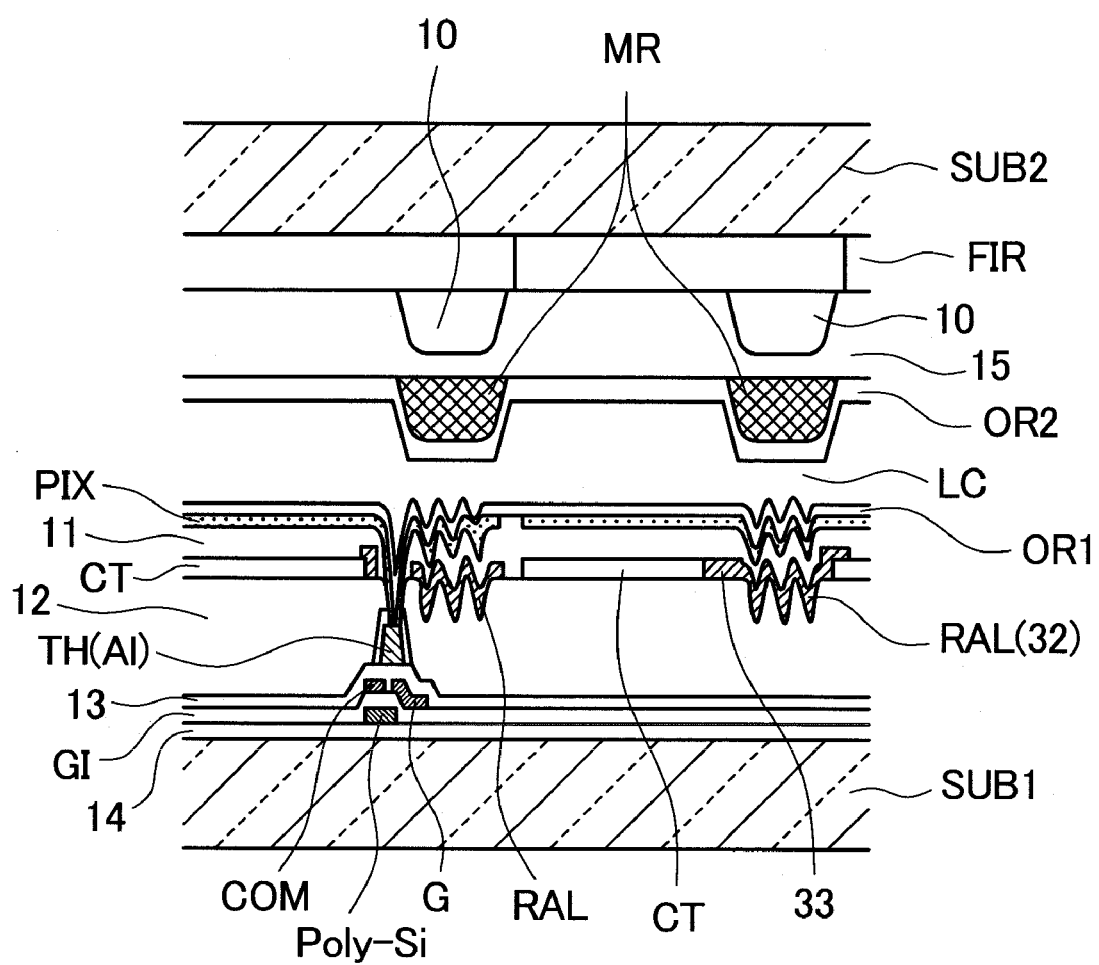
FIG. 2 is a cross-sectional view of an essential part showing the schematic constitution of the sub pixel of the transflective liquid crystal display device of the embodiment 1 according to the present invention.

FIG. 1 is a plan view showing the electrode structure of a sub pixel of a transflective liquid crystal display device of an embodiment 1 according to the present invention, and FIG. 2 is a cross-sectional view of an essential part showing the schematic constitution of the sub pixel of the transflective liquid crystal display device of the embodiment 1 according to the present invention. Here, FIG. 2 is a cross-sectional view taken along a line A-A in FIG. 1.

As shown in FIG. 2, in this embodiment, a pair of glass substrates (SUB1, SUB2) is provided in a state that a liquid crystal layer (LC) is sandwiched between the pair of glass substrates (SUB1, SUB2). In this embodiment, a main surface side of the glass substrate (SUB2) constitutes an observation side.

On a liquid crystal layer side of the glass substrate (SUB2), in order from the glass substrate (SUB1) toward a liquid crystal layer (LC), a black matrix (BM), color filter layers (FIR), optical elements (½ wave plates) 10 which change a polarization state of light, an insulation film 15, step forming layers (MR), and an orientation film (OR2) are formed. Here, on an outside the glass substrate (SUB2), a polarizer (not shown in the drawing) is formed.

Further, on a liquid crystal layer side of the glass substrate (SUB1), in order from the glass substrate (SUB1) toward the liquid crystal layer (LC), a background insulation film 14, a semi-conductor layer (Poly-Si) made of poly-silicon, a gate insulation film (GI), counter electrode lines (COM) and scanning lines (also referred to as gate lines) (G), an interlayer insulation film 13, an interlayer insulation film 12, counter electrodes (CT) and reflective electrodes (RAL), an interlayer insulation film 11, pixel electrodes (PIX) and an orientation film (ORM) are formed. Here, also on an outside of the glass substrate (SUB1), a polarizer (not shown in the drawing) is formed.

The pixel electrodes (PIX) and the counter electrodes (CT) are, for example, formed of a transparent conductive film made of ITO (Indium Tin Oxide) or the like, for example. Further, in this embodiment, the counter electrodes (CT) are formed in a planar shape and, at the same time, the pixel electrode (PIX) and the counter electrode (CT) are overlapped to each other by way of an interlayer insulation film 11. Due to such a constitution, a holding capacitance is formed. Here, the interlayer insulation film 11 is not limited to one layer and may be formed of two layers or more.

Returning to FIG. 1, symbol D indicates video lines (also referred to as drain lines or source lines), symbol TH indicates through holes (also referred to as contact holes), and symbol BM indicates the black matrix.

A video voltage is applied to the pixel electrode (PIX) from the video line (D) via a thin film transistor (TFT) having a semiconductor layer (Poly-Si) and the through hole (TH). Metal (for example, aluminum (Al)) is filled in the through hole (TH).

A transmissive part indicated by numeral 30 in FIG. 1 constitutes a transmissive liquid crystal display panel, and a reflective part indicated by numeral 31 in FIG. 1 constitutes a reflective liquid crystal display panel.

The reflective part 31 includes a reflective electrode (RAL). Here, in FIG. 2, the reflective electrode (RAL) is constituted of a metal film formed of aluminum (Al), for example. However, the reflective electrode (RAL) is not limited to the metal film and, the reflective electrode (RAL) may be formed of the two-layered structure consisting of a lower layer made of molybdenum (Mo) and an upper layer made of aluminum (Al). Further, these metal films (Mo/Al, or Al) may be formed on the counter electrode (CT).

Figure 3:
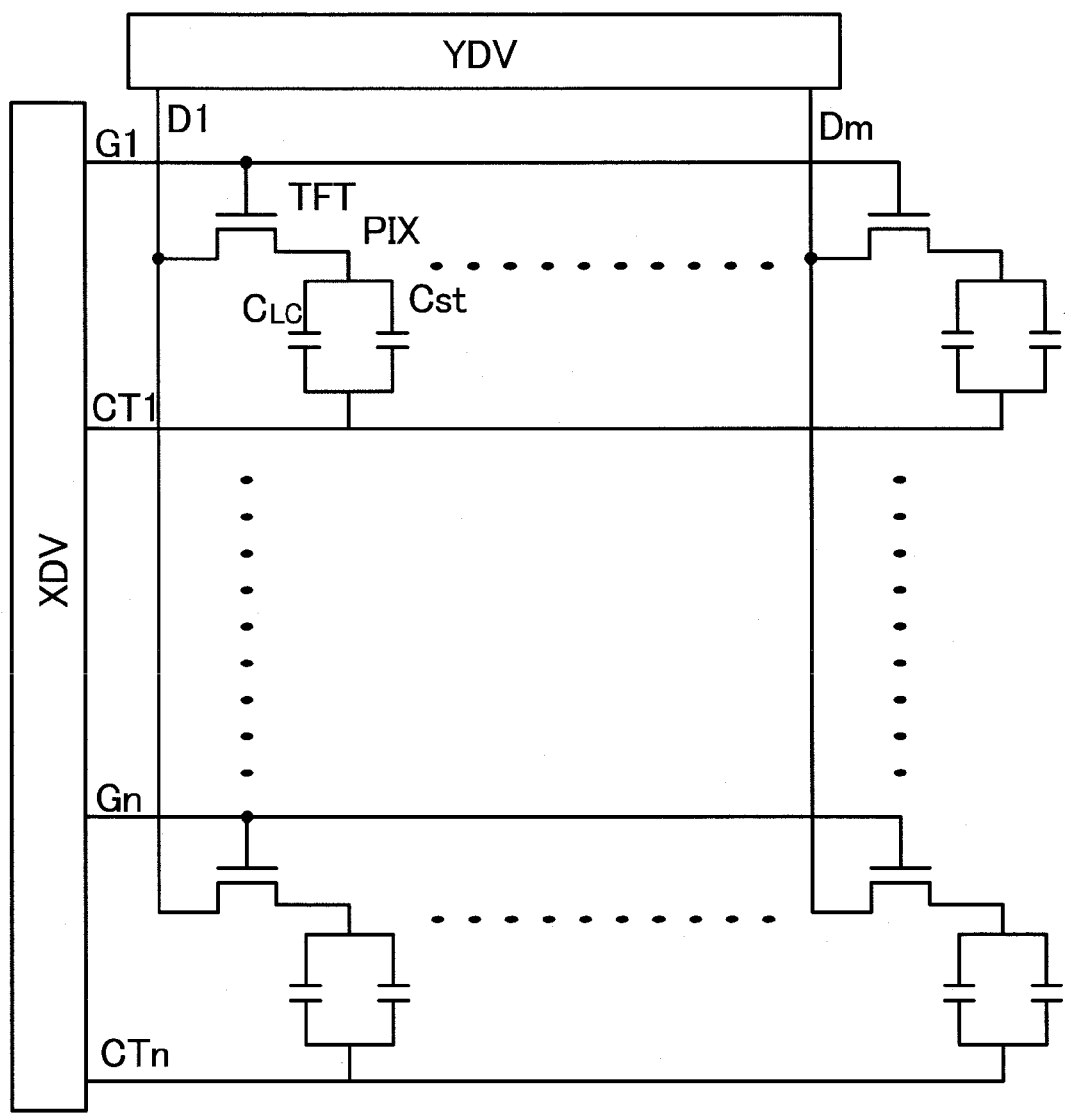
FIG. 3 is a view showing an equivalent circuit of a liquid crystal display panel of the transflective liquid crystal display device of the embodiment 1 according to the present invention.

FIG. 3 is a view showing an equivalent circuit of the liquid crystal display panel of the transflective liquid crystal display device according to this embodiment. In FIG. 3, a capacitive element (CLC) is a liquid crystal capacitance, and capacitive element (Cst) is a holding capacitance (also referred to as a storage capacitance) which is formed of the pixel electrode (PIX) and the counter electrode (CT) sandwiching an interlayer insulation film 11 therebetween.

In the liquid crystal display panel of this embodiment, as shown in FIG. 3, the sub pixels are arranged in (n rows×m columns). For example, in a color-display liquid crystal display panel used in a mobile phone, 240×320×3 pieces of sub pixels are arranged in a matrix array.

Here, in FIG. 3, symbol YDV indicates a horizontal scanning circuit, and symbol XDV indicates a vertical scanning circuit. Further, a driving method of the liquid crystal display device of this embodiment is equal to a driving method of a conventional IPS-type liquid crystal display device and hence, the explanation of the driving method is omitted.

The reflective electrode (RAL) in the reflective part 31 includes an uneven portion 32 and a flat portion 33. The flat portion 33 of the reflective electrode (RAL) is arranged on a boundary portion between the transmissive part 30 and the reflective part 31.

Further, as shown in FIG. 1, the pixel electrode (PIX) includes a pixel electrode in the transmissive part 30 (PIXP), a pixel electrode in the reflective part 31 (PIXR), and a strip-like connection part (PIXT) which is formed between the pixel electrode in the transmissive part 30 (PIXP) and the pixel electrode in the reflective part 31 (PIXR). Here, as shown in FIG. 1, the pixel electrode in the transmissive part 30 (PIXP) and the pixel electrode in the reflective part 31 (PIXR) are respectively formed in a comb-teeth shape.

Here, as shown in FIG. 1, FIG. 2, the strip-like connection part (PIXT) which constitutes a portion of the pixel electrode (PIX) is formed in a region where the flat portion 33 of the reflective electrode (RAL) is formed.

Further, the pixel electrode in the reflective part 31 (PIXR) is formed in a region where the uneven portion 32 of the reflective electrode (RAL) is formed.

Further, the through hole (TH) which is provided for applying a video voltage to the pixel electrode (PIX) is also formed in a region where the flat portion 33 of the reflective electrode (RAL) is formed.

In this embodiment, the comb-teeth electrodes on both ends of the pixel electrode (PIXR) in the reflective part 31 are arranged to approach to the vicinity of the drain line (D). Further, the electrode width of the comb-teeth electrode in the transmissive part 30 and the electrode width of the comb-teeth electrode in the reflective part 31 are set substantially equal to each other, and an interval between the comb-teeth electrodes in the reflective part 31 is set small compared to an interval between the comb-teeth electrodes in the transmissive part 30.

Accordingly, in this embodiment, the number of the comb-teeth electrodes which constitute the pixel electrode in the reflective part 31 (PIXR) is large compared to the number of the comb-teeth electrodes which constitute the pixel electrode (PIXR) in the transmissive part 30.

Further, on the glass substrate (SUB2), the optical elements 10 and the step forming layers (MR) are formed. The step forming layers (MR) are provided for adjusting a cell gap length (d) of the liquid crystal layer (LC) in the reflective part 31 such that an optical path length of light in the reflective part 31 becomes an optical path length corresponding to a 2J4 wave plate in the reflective part 31.

Further, as described in the above-mentioned patent document 1, in the IPS-type transflective liquid crystal display device, for example, when the transmissive part performs a normally black display, the reflective part performs a normally white display thus giving rise to a drawback that a contrast is reversed between the transmissive part and the reflective part. The optical element 10 is constituted of a ½ wave plate, for example, and prevents the contrast from being reversed between the transmissive part 30 and the reflective part 31.

Here, in FIG. 1, FIG. 2 and other corresponding drawings, although an active matrix is constituted of a plurality of scanning lines (G), a plurality of video lines (D) which intersect the plurality of scanning lines (G), and thin film transistors (TFT: active elements) which are formed corresponding to the respective sub pixels, these parts are omitted from the drawings. Further, the counter electrode (CT) is electrically connected with the counter electrodes (CT) of the respective sub pixels in the direction orthogonal to the scanning direction B shown in FIG. 1.

Conventionally, in the IPS-type transflective liquid crystal display device, the reflective part 31, because of the short cell gap length (d), is largely influenced by anchoring strengths of the upper and lower orientation films (OR1, OR2) and hence, liquid crystal molecules are not sufficiently operated. This brings about the lowering of reflection efficiency.

Accordingly, it is desirable to increase the efficiency of an operation of liquid crystal molecules by properly designing the electrode structure or the like. However, the optimum electrode specifications for the transmissive part 30 and the reflective part 31 differ from each other. Accordingly, the electrode design which adversely influences neither one in the transmissive part 30 and the reflective part 31 becomes necessary.

Further, in a boundary portion between the transmissive part 30 and the reflective part 31, the step forming part (MR) is formed on another glass substrate (SUB2) side. However, the step forming part (MR) usually has an inclination angle or a positional displacement exists between one glass substrate (SUB1) and another glass substrate (SUB2) and hence, the boundary portion between the transmissive part 30 and the reflective part 31 cannot obtain the desired cell gap length.

Usually, such a portion adversely influences the optical characteristic of the transmissive part 30 and hence, such a portion is set as a portion of the reflective part 31. However, the portion differs from the reflective part 31 with respect to the desired optical condition and hence, the portion cannot obtain the black brightness of the reflective part 31 sufficiently thus lowering a reflection contrast. Accordingly, it is necessary to set this portion as an ineffective region which does not influence the characteristic of the reflective part 31.

Conventionally, with respect to the IPS-type transflective liquid crystal display device, in the transmissive part 30, to prevent a phenomenon that the neighboring pixels influence each other thus generating leaking of light, it is necessary to make the comb-teeth electrodes at both ends of the pixel electrode (PIXP) spaced apart from a center line of the drain line (D) by, for example, 8.5 µm or more from each other. On the other hand, when the comb-teeth electrodes at both ends of the pixel electrode (PIXR) in the reflective part 31 are spaced apart from the center line of the drain line (D) by, for example, 8.5 µm or more, the liquid crystal molecules are not operated in many portions.

Accordingly, in the IPS-type transflective liquid crystal display device of this embodiment, to enhance the efficiency of the reflective part 31, the comb-teeth electrodes at both ends of the pixel electrode (PIXR) in the reflective part 31 are arranged close to the vicinity of the drain line (D). In this case, an electrode width of the comb-teeth electrode is substantially equal between the reflective part 31 and the transmissive part 30, while the interval of the comb-teeth electrodes in the reflective part 31 is set small compared with the interval of the comb-teeth electrodes in the transmissive part 30.

Figure 4:
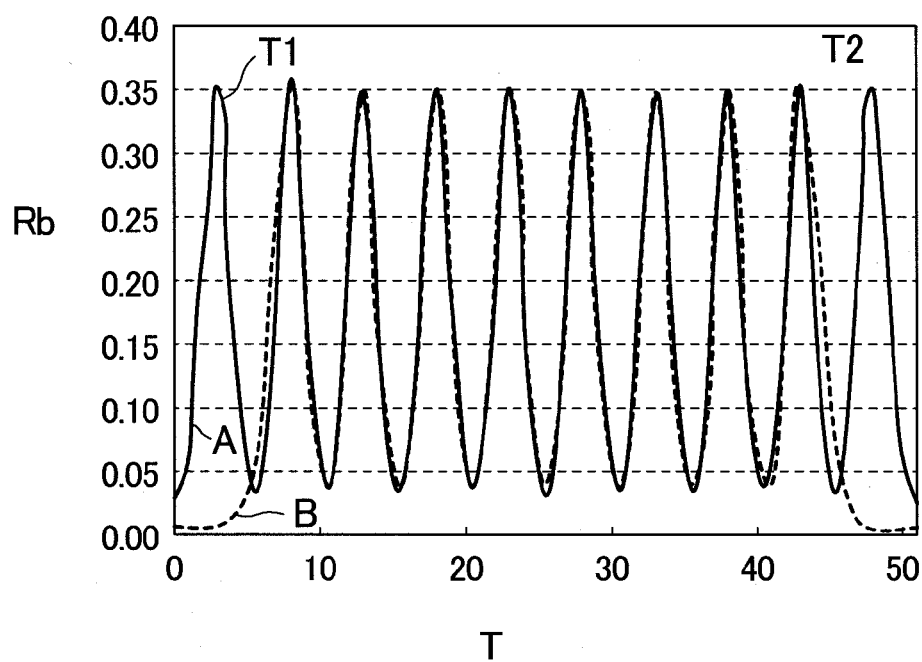
FIG. 4 is a graph showing the distribution of reflectance of a transverse cross-section of a comb-teeth electrode of a reflective part in the IPS-type transflective liquid crystal display device of the embodiment 1 according to the present invention.

Accordingly, in this embodiment, compared to the number of the comb-teeth electrodes of the pixel electrode (PIXP) in the transmissive part 30, the number of the comb-teeth electrodes of the pixel electrode (PIXR) in the reflective part 31 is large. Due to such a constitution, in the reflective part 31, the liquid crystal molecules are favorably operated at portions close to the drain line (D) and hence, as shown in FIG. 4, it is possible to increase points (T1, T2 in FIG. 4) where the reflectance is high.

As a result, in this embodiment, the reflective part can increase the reflection efficiency as a whole. Here, FIG. 4 is a graph showing the distribution of reflectance on the transverse cross section of the comb-teeth electrodes in the reflective part 31 in the IPS-type transflective liquid crystal display device of this embodiment. Symbol A in FIG. 4 shows the distribution of the reflectance of the IPS-type transflective liquid crystal display device of this embodiment and symbol B in FIG. 4 shows the distribution of the reflectance of the conventional IPS-type transflective liquid crystal display device. Further, in FIG. 4, Symbol T indicates a distance from the end portion of the sub pixel and symbol Rb indicates the reflectance.

In general, the regular reflection light does not contribute to the reflection characteristic of the reflective part 31. This is because that a light source and a viewer are usually not located at the same position.

Accordingly, in this embodiment, the invalid region of the boundary portion between the transmissive part 30 and the reflective part 31 is formed into a planar surface. On the other hand, when layouts of the pixel electrodes (PIX) in the transmissive part 30 and the reflective part 31 are formed respectively independently, the invalid region is inevitably generated in the boundary portion between the transmissive part 30 and the reflective part 31. Such a portion is arranged to be overlapped to the above-mentioned flat portion thus preventing the decrease of the effective region.

That is, in this embodiment, the reflective electrode (RAL) is constituted of an uneven portion (32) and a flat portion (33), wherein the flat portion (33) is arranged in the invalid region of the boundary portion between the transmissive part 30 and the reflective part 31. Further, a power supply part (contact hole: TH) to the pixel electrodes (PIX) also constitutes the valid region and hence, the power supply part is formed in the above-mentioned flat portion.

Figure 5:
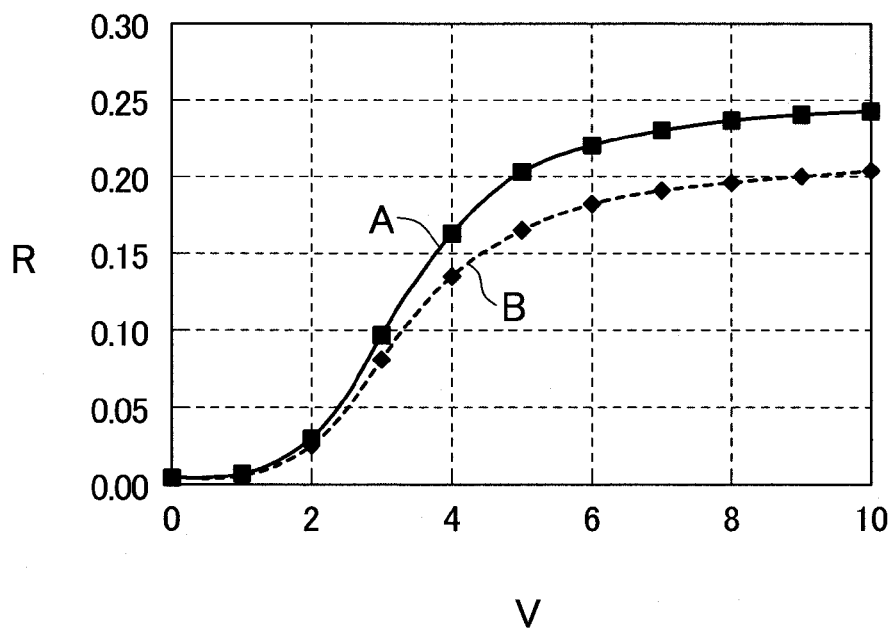
FIG. 5 is a graph showing the voltage dependency characteristic of reflection efficiency of the reflective part in the IPS-type transflective liquid crystal display device of the embodiment 1 according to the present invention.

According to the IPS-type transflective liquid crystal display device of this embodiment, as indicated by symbol A shown in FIG. 5, the reflection efficiency of the reflective part can be increased as a whole compared to the reflection efficiency of the conventional IPS-type transflective liquid crystal display device (B in FIG. 5).

Here, FIG. 5 is a graph showing the voltage dependency characteristic of the reflection efficiency of the reflective part 31 in the IPS-type transflective liquid crystal display device of this embodiment. Further, in FIG. 5, symbol V indicates a voltage applied to the liquid crystal layer (LC) of the reflective part 31, and R indicates reflection efficiency.

Embodiment 2

Figure 6:
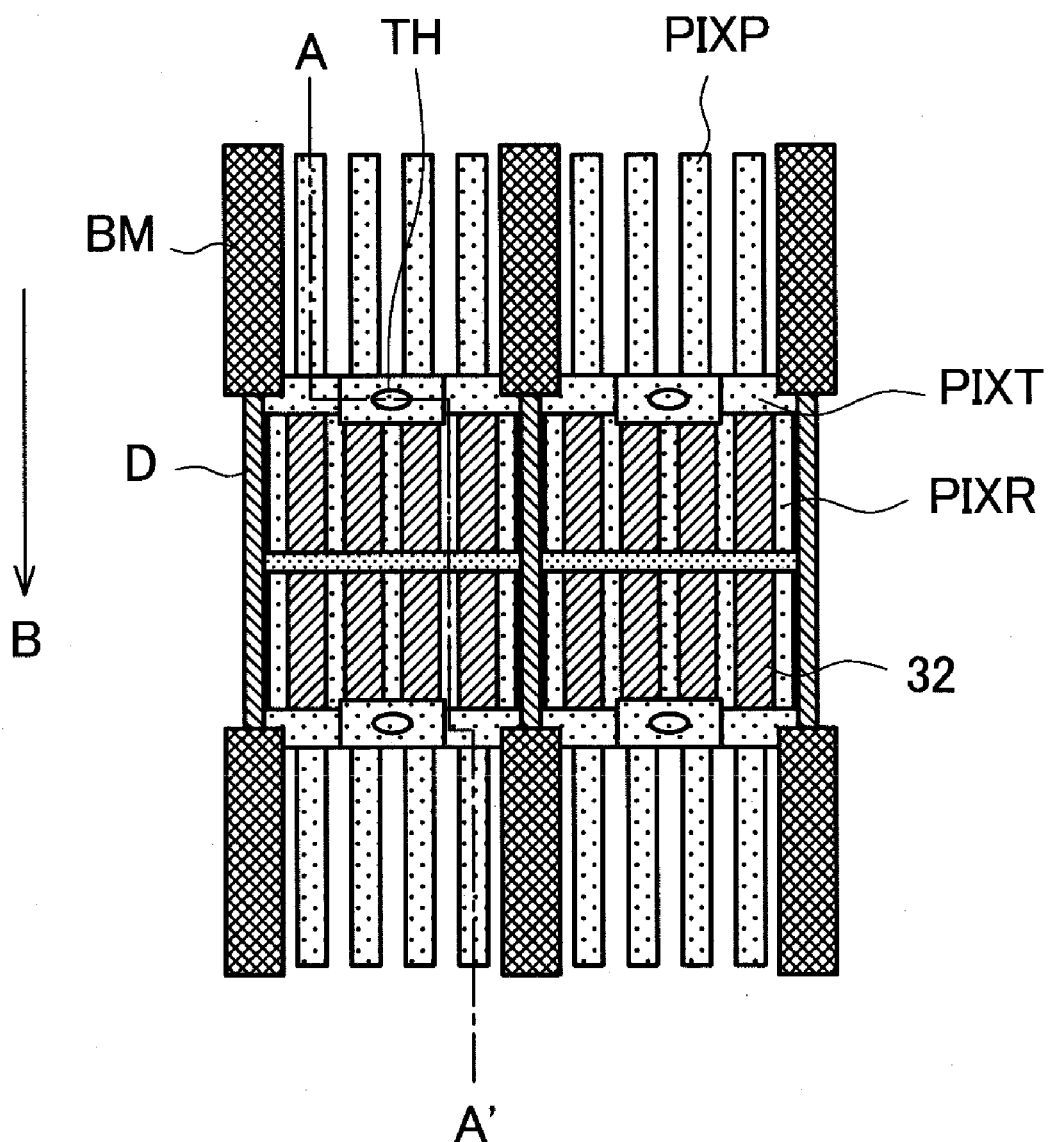
FIG. 6 is a plan view showing the electrode structure of a sub pixel of a transflective liquid crystal display device of an embodiment 2 according to the present invention.
Figure 7:
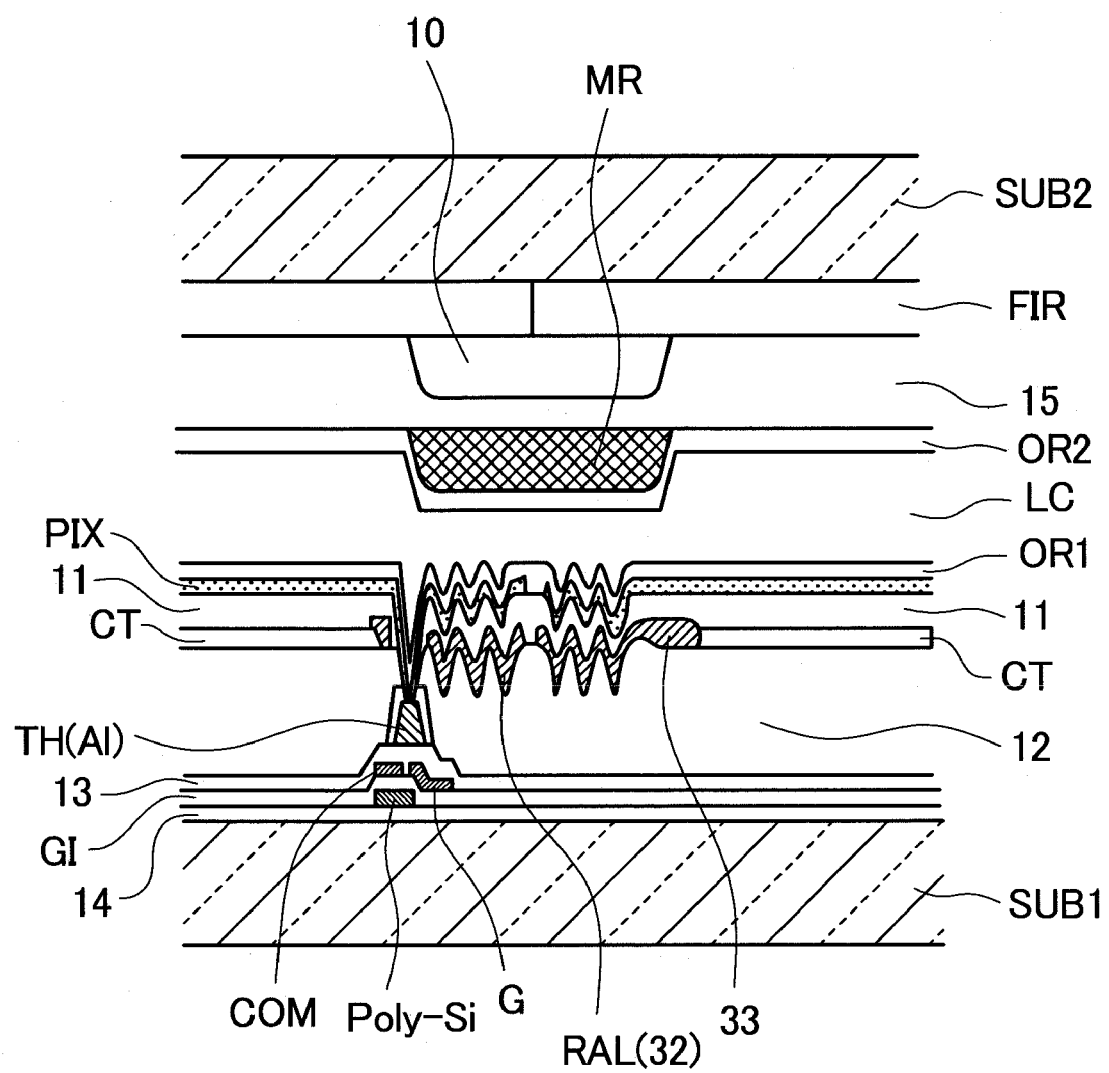
FIG. 7 is a cross-sectional view of an essential part showing the schematic constitution of the sub pixel of the transflective liquid crystal display device of the embodiment 2 according to the present invention.
Figure 8:
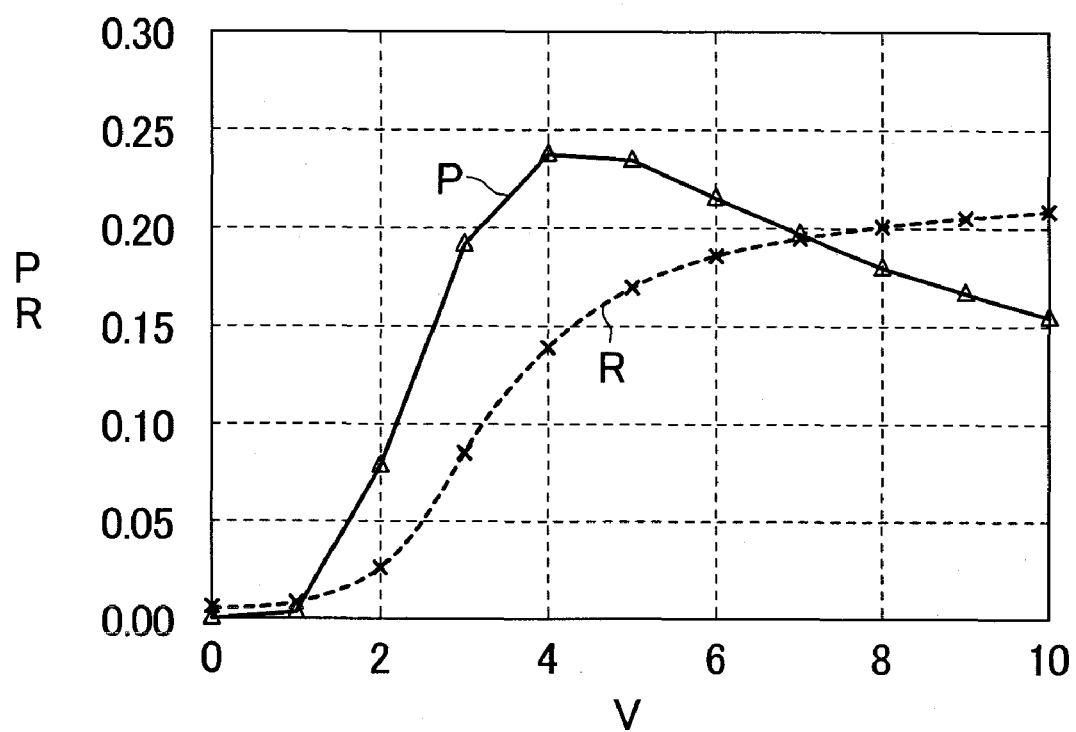
FIG. 8 is a graph showing a voltage (V) which is applied to liquid crystal, a transmission efficiency (P) characteristic and a reflection efficiency (R) characteristic of an IPS type transflective liquid crystal display device.

FIG. 6 is a plan view showing the electrode structure of a sub pixel of a transflective liquid crystal display device of an embodiment 2 according to the present invention, and FIG. 7 is a cross-sectional view of an essential part showing the schematic constitution of the sub pixel of the transflective liquid crystal display device of the embodiment 2 according to the present invention. Here, FIG. 7 is a cross-sectional view taken along a line A-A' in FIG. 6.

As shown in FIG. 6 and FIG. 7, in this embodiment, neighboring pixels in the scanning direction (indicated by an arrow B in FIG. 6) are provided with a common step forming layer (MR) and an optical element 10.

In this embodiment, it is possible to decrease the invalid region attributed to the overlapping displacement of one glass substrate (SUB1) and another glass substrate (SUB2) or the inclined portion of the step forming portion (MR).

Although the invention made by inventors of the present inventions has been specifically explained in conjunction with the embodiments, the present invention is not limited to the above-mentioned embodiments and various modifications are conceivable without departing from the gist of the present invention.

What is claimed is:

1. A liquid crystal display device comprising:
a first substrate;
a second substrate;
a liquid crystal layer formed between the first substrate and the second substrate; and
a transistor formed in a pixel;
wherein a first insulating layer is formed over the transistor, a first electrode is formed on the first insulating layer, a second insulating layer is formed on the first electrode, a second electrode is formed on the second insulating layer, and the first electrode has a plane shape and the second electrode has a line shape portion.

2. The liquid crystal display device according to claim 1, wherein the second insulating layer is formed of plural layers.

3. The liquid crystal display device according to claim 1, wherein the liquid crystal display device is a transflective liquid crystal display device.

4. A liquid crystal display device comprising:
a first substrate;
a second substrate;
a liquid crystal layer formed between the first substrate and the second substrate; and
a transistor formed in a pixel;
wherein a first insulating layer is formed over the transistor, and a storage capacitance is formed on the first insulating layer.

5. The liquid crystal display device according to claim 4, wherein the storage capacitance is formed by a first electrode formed on the first insulating layer, a second insulating layer is formed on the first electrode, and a second electrode formed on the second insulating layer.

6. The liquid crystal display device according to claim 5, wherein the first electrode has a plane shape and the second electrode has a line shape portion.

7. The liquid crystal display device according to claim 6, wherein the second insulating layer is formed of plural layers.

8. The liquid crystal display device according to claim 7, wherein the liquid crystal display device is a transflective liquid crystal display device.

* * * * *